US008586655B2

(12) United States Patent
Carrubba (10) Patent No.: US 8,586,655 B2
(45) Date of Patent: Nov. 19, 2013

(54) COMPOSITE BOARDS AND A METHOD OF MAKING THE SAME (71) Applicant: Vincent Carrubba, Baldwin, NY (US)

(72) Inventor: Vincent Carrubba, Baldwin, NY (US)

( * ) Notice: Subject to any disclaimer, the term of this patent is extended or adjusted under 35 U.S.C. 154(b) by 0 days.

(21) Appl. No.: 13/736,607

(22) Filed: Jan. 8, 2013

(65) Prior Publication Data
US 2013/0178561 A1 Jul. 11, 2013

Related U.S. Application Data (60) Provisional application No. 61/585,035, filed on Jan. 10, 2012.

(51) Int. Cl.
*B29C 47/00* (2006.01)
*B02C 23/00* (2006.01)
*D21J 1/08* (2006.01)
*B27K 5/00* (2006.01)
*C08K 11/00* (2006.01)
*D21B 1/04* (2006.01)
*B02B 1/00* (2006.01)
*B02C 21/00* (2006.01)
*B07B 7/00* (2006.01)

(52) U.S. Cl.
USPC ............. 524/13; 524/15; 241/43; 264/115

(58) Field of Classification Search
USPC ................... 524/13, 15; 428/292.4
See application file for complete search history.

(56) References Cited

U.S. PATENT DOCUMENTS

| 5,085,898 | A | 2/1992 | Welteke et al. | |
|---|---|---|---|---|
| 8,012,389 | B2 | 9/2011 | Warnes et al. | |
| 2002/0040557 | A1 | 4/2002 | Felton | |
| 2003/0091804 | A1* | 5/2003 | Li et al. | 428/292.4 |
| 2009/0130377 | A1 | 5/2009 | Samanta et al. | |
| 2010/0056699 | A1 | 3/2010 | Dobashi et al. | |
| 2011/0250814 | A1* | 10/2011 | Bradley et al. | 442/341 |

FOREIGN PATENT DOCUMENTS

| EP | 0786496 | A | 8/2004 |
|---|---|---|---|
| KR | 1020090109025 | A | 10/2009 |
| WO | 2006052967 | A | 5/2006 |
| WO | 2006059339 | A | 6/2006 |

OTHER PUBLICATIONS

International Search Report for PCT/US2013/020628 dated Mar. 14, 2013.*
Bettini et al. "Investigation on the Use of Coir Fiber as Alternative Reinforcement in Polypropylene" Journal of Applied Polymer Science, 2010, 118(5), 2841-2848. (Abstract).
Enriquez et al. "Fabrication and Characterization of High-Density Polyethylene-Coconut Coir Composites with Stearic Acid as Compatibilizer" Journal of Thermoplastic Composite Materials, 2010, 23(3), 361-373. (Abstract).
Gu. "Tensile Behaviours of the Coir Fibre and Related Composites After NaOH Treatment" Materials & Design, 2009, 30(9), 3931-3934. (Abstract).
Haque et al. "Physico-Mechanical Properties of Chemically Treated Palm and Coir Fiber Reinforced Polypropylene Composites" Bioresource Technology, 2009, 100(20), 4903-4906. (Abstract).
Islam et al. "Physico-Mechanical Properties of Chemically Treated Coir Reinforced Polypropylene Composites" Composites Part A, 2010, 41(2), 192-198. (Abstract).
Islam et al. "Mechanical and Morphological Properties of Chemically Treated Coir-Filled Polypropylene Composites" Ind. Eng. Chem. Res., 2009, 48(23), 10491-10497. (Abstract).
Lai et al. "Mechanical and Electrical Properties of Coconut Coir Fiber-Reinforced Polypropylene Composites" Polymer-Plastics Technology and Engineering, 2005, 44(4), 619-634. (Abstract).
Sharma et al. "Studies on the Weathering Behavior of Glass Coir Polypropylene Composites" Journal of Reinforced Plastics and Composites, 2009, 28, 2605-2613. (Abstract).
Tan et al. "Effect of Alkali Treatment of Coir Fiber on its Morphology and Performance of the Fiber/LLDPE Bio-Composites," Advanced Materials Research, 2010, 139-141, 348. (Abstract).
Tan et al. "Effect of Interface Improving on Morphology and Properties of Coir Fiber/LLDPE Bio-Composites," Advanced Materials Research, 2011, 217-218, 1245. (Abstract).

* cited by examiner

*Primary Examiner* — Ling Choi
*Assistant Examiner* — Ronald Grinsted
(74) *Attorney, Agent, or Firm* — Kramer & Amado P.C.

(57) ABSTRACT

A composite board is manufactured from hydrophobic coconut coir fibers which have been treated to remove at least a portion of coconut pith therefrom; and a hydrophobic vinyl polymer, such as a polyolefin. The composite board is manufactured without any step of chemically modifying coconut coir fibers. The composite board is manufactured by removing at least a portion of coconut pith from coconut coir fibers using a cyclonic separator; combining coconut coir fibers with a hydrophobic polymer to form a mixture; and extruding the mixture to form a composite board.

17 Claims, 6 Drawing Sheets

COMPOSITE BOARDS AND A METHOD OF MAKING THE SAME

CROSS-REFERENCE TO RELATED APPLICATIONS

This application is claims priority to U.S. Provisional Application No. 61/585,035, filed on Jan. 10, 2012. The entire disclosure of the prior application is incorporated by reference herein in its entirety.

BACKGROUND

1. Field of the Invention

This invention relates generally to fiber-reinforced polymer composites, preferably containing natural fibers, more preferably coconut coir fibers.

2. Description of Related Art

Fiber-reinforced polymer composites containing synthetic or natural fibers have been used as construction materials in the past. Plastics reinforced with synthetic fibers possess high strength, but are expensive to produce. Unlike synthetic fibers, natural fibers are readily available. However, natural fibers are hydrophilic, which causes them to be incompatible with many hydrophobic polymers, including polyvinyl chloride (PVC) and polyolefins.

Coir is a natural fiber obtained from coconut husks. Coir fibers are strong, lightweight, and abundant. In the past, coir fibers have been used as reinforcement in polymeric composite materials. However, raw coir is normally hydrophilic, rendering them incompatible with polyolefins and PVC. Specifically, raw coir as used in the prior art include coir fibers and coconut pith. While coir fibers are comparatively hydrophobic, pith is very hydrophilic and is incompatible with polyolefins and PVC. Complete separation of coir and pith by physical processes has not been achieved in the prior art.

To overcome incompatibility between coir and a polymer matrix, coir-reinforced composites have been made using hydrophilic resins, including epoxy resins and polyurethanes. In many cases, epoxy resins and polyurethanes have reactive sites, such as epoxide or isocyanate functionalities, which can react with hydrophilic sites on the coir fibers.

Composites made from hydrophilic fibers and/or polymers present the difficulty that they have a tendency to absorb water, rendering them unsuitable for use in outdoor construction. Attempts to overcome this have been made by using polyolefins as matrix polymers in coir-reinforced materials. However, since coir used in the past is hydrophilic, this material has been found to be incompatible with hydrophobic polymers. As a result, coir-reinforced polyolefin composites of the prior art use chemically modified coir. Coir, as used in these composites, has been modified to incorporate hydrophobic groups into the coir structure, increasing compatibility between the coir and the polyolefin.

The current disclosure relates to fiber-reinforced polymer composites containing natural coir fibers and a hydrophobic matrix polymer. Compatibility between the coir fibers and the hydrophobic matrix polymer is increased without requiring chemical modification of the fibers.

SUMMARY

In light of the present need for improved reinforced polymer composites containing natural fibers, a brief summary of various embodiments is presented. Some simplifications and omissions may be made in the following summary, which is intended to highlight and introduce some aspects of the various exemplary embodiments, but not to limit the scope of the invention.

Various embodiments disclosed herein relate to composite boards manufactured from hydrophobic polymers, i.e., PVC or polyolefins, and hydrophobic coconut coir fibers which have been treated to remove coconut pith therefrom. In various embodiments, the composite board is manufactured without any step of chemically modifying coconut coir fibers. In various embodiments, the coconut coir fibers have been treated to remove at least a portion of the coconut pith therefrom. In various embodiments, the coconut coir fibers have been treated to remove substantially all of the coconut pith therefrom.

In certain embodiments, the composite board is manufactured by removing at least a portion of the coconut pith from coconut coir fibers using a cyclonic separator; combining coconut coir fibers with a hydrophobic polymer to form a mixture; and extruding the mixture to form a composite board. In some embodiments, the composite board is manufactured by removing substantially all of the coconut pith from coconut coir fibers using a cyclonic separator; combining coconut coir fibers with a hydrophobic polymer to form a mixture; and extruding the mixture to form a composite board.

Various embodiments relate to a process of preparing a composite board by removing at least a portion of the coconut pith from coconut coir fibers; combining the coconut coir fibers with a polymer to form a mixture, and extruding the mixture to form a composite board. Removal of at least a portion of the coconut pith from coconut coir fibers may be done by abrading the coir fibers to release pith from the coir fibers, entraining the coir fibers and pith in a high-velocity stream of heated air, and separating coir fibers from the air stream in a cyclonic separator. Coir fibers may be collected in a hopper or vessel beneath the cyclonic separator while a high-velocity air stream exiting the cyclonic separator carries the lightweight pith. The hydrophobic polymer may be an olefin homopolymer, an olefin copolymer, polyvinyl chloride, polyvinylidine chloride, polystyrene, or a mixture thereof. The polymer may be virgin polymer, recycled polymer, or regrind polymer. The polymer is preferably polyethylene or polypropylene. The polymer is preferably either virgin polymer or recycled polymer, such as virgin polyethylene, recycled polyethylene, virgin polypropylene or recycled polypropylene.

In various embodiments, the polymer is combined with the coconut coir fibers and mixed in an extruder. The mixture of the coir fibers and the polymer is mixed in the extruder, and the resulting coir fiber-polymer mixture is extruded to form a composite product. The composite product may be a composite board. Alternatively, the composite product may be a plurality of pellets.

Pellets formed from the mixture by extruding may be supplied to a second extruder, and melted in the second extruder. The molten pellets may then be extruded to form a composite board.

Various embodiments of the current disclosure are directed to a composite board which has been manufactured from coconut coir fibers which have been treated to remove at least a portion of the coconut pith therefrom; and a polymeric matrix comprising a polymer selected from the group consisting of olefin homopolymers, olefin copolymers, polyvinyl chloride, polyvinylidine chloride, polystyrene, and mixtures thereof. Preferably, the coconut coir fibers have not been chemically modified. Preferably, the coconut coir fibers have been treated to remove substantially all of the coconut pith therefrom.

In some embodiments, the polymer matrix may include additives which do not chemically modify the fiber structure. These additives may include colorants, i.e., pigments or non-reactive dyes, or plasticizers.

In various embodiments, the polymer matrix for the composite board comprises a thermoplastic material, i.e., polyethylene or polypropylene, in combination with coconut coir fibers treated for removal of pith. The polymer matrix may contain an optional organic filler selected from the group consisting of ramie fibers, bamboo fibers, rice hulls, wheat husks, linen, jute, bagasse, corn husks, and sawdust. The polymer matrix may also contain an optional inorganic filler such as glass fibers, carbon fibers, mineral fibers, silica, alumina, titania, carbon black, nitride compounds, and carbide compounds.

In various embodiments, the polymer matrix for the composite board contains UV stabilizers which reduce the likelihood of the composite board undergoing degradation from exposure to ultraviolet light. Such UV stabilizers include organic light stabilizers, such as benzophenone light stabilizers, hindered amine light stabilizers, and benzotriazoles; and inorganic light stabilizers, such as barium metaborate and its hydrates.

In various embodiments, the polymer matrix for the composite board contains antifungal agents which increase resistance of the board to mold and other organisms. The antifungal agents may be incorporated into the binder of the composite board. Useful antifungal agents include copper (II) 8-quinolinolate; zinc oxide; zinc-dimethyldithiocarbamate; 2-mercaptobenzothiazole; zinc salt; barium metaborate; tributyl tin benzoate; bis tributyl tin salicylate; tributyl tin oxide; parabens: ethyl parahydroxybenzoate; propyl parahydroxybenzoate; methyl parahydroxybenzoate and butyl parahydroxybenzoate; methylene bis(thiocyanate); 1,2-benzisothiazoline-3-one; 2-mercaptobenzo-thiazole; 5-chloro-2-methyl-3(2H)-isothiazolone; 2-methyl-3(2H)-isothiazolone; zinc 2-pyridinethiol-N-oxide; tetra-hydro-3,5-dimethyl-2H-1,3,5-thiadiazine-2-thione; N-trichloromethyl-thio-4-cyclohexene-1,2-dicarboximide; 2-n-octyl-4-isothiazoline-3-one; 2,4,5,6-tetrachloro-isophthalonitrile; 3-iodo-2-propynyl butylcarbamate; diiodomethyl-p-tolylsulfone; N-(trichloromethyl-thio)phthalimide; potassium N-hydroxy-methyl-N-methyl-dithiocarbamate; sodium 2-pyridinethiol-1-oxide; 2-(thiocyanomethylthio)benzothiazole; and 2-4(-thiazolyl)benzimidazole.

The polymer matrix for the composite board may contain additives which help provide strength and scratch resistance to the board surface. Additives which help increase scratch resistance to the board surface include lubricants and very hard mineral fillers, including carbide and nitride ceramics.

The board surface may also include inorganic pigments, organic pigments, or dyes as colorants. The board surface may be embossed with a decorative pattern, i.e., wood grain or imitation stone.

The current disclosure also relates to a method of producing hydrophobic coconut coir fibers by chopping coconut husks to produce raw coconut coir; releasing hydrophilic coconut pith from the coconut coir by abrading the coconut coir; separating the hydrophilic coconut pith from the coconut coir fibers in a cyclonic separator; and recovering hydrophobic coconut coir fibers from the cyclonic separator.

In certain embodiments, hydrophobic coconut coir fibers are prepared by chopping coconut husks to produce raw coconut coir; releasing hydrophilic coconut pith from coconut coir fibers by abrading the coconut coir; drying the coconut pith and the coconut coir fibers in an air stream, preferably a heated air stream; separating the coconut pith from the coconut coir fibers in a cyclonic separator; and recovering hydrophobic coconut coir fibers from the cyclonic separator.

Various embodiments disclosed in the current disclosure relate to building materials prepared using coir fibers having low pith content or no pith content, contained in a matrix binder. In various embodiments, the matrix binder is a thermoplastic or thermosetting polymeric binder. The matrix binder may be a thermoplastic binder. The thermoplastic binder may be a polyester, a polycarbonate, a polyolefin, polystyrene, a copolymer of at least one olefin having from two to twelve carbon atoms and a second vinyl monomer, i.e., styrene, a vinyl ester, a vinyl halide, or an ester of an unsaturated acid; polyvinyl halide, or polyvinylidine halide. The thermoplastic binder is preferably a polyolefin, polyvinyl halide, or polyvinylidine halide, more preferably polypropylene, polyethylene, high density polyethylene, low density polyethylene, linear low density polyethylene, or medium density polyethylene. Composites with thermoplastic binders may be prepared by extrusion molding.

The thermosetting binder may be a phenol-formaldehyde resin, an epoxy resin, or a urea-formaldehyde resin. In various embodiments, coir fiber may be used in a composite having a cement, plaster, or other mineral binder. According to various embodiments, composites with thermosetting binders or mineral binders, i.e., cement binders, may be prepared by compression molding in a press to form large sheets or to form planks or boards.

In various embodiments, the current application is directed to building materials prepared using a composition containing from 5% to 70% by weight of coir fibers prepared by the process described herein; optionally various processing additives, including colorants, i.e., dyes or pigments; fillers; plasticizers, and other additives; with the balance of the composition being a thermoplastic, thermosetting, or mineral matrix binder.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

The present disclosure relates to a composite board manufactured using coconut coir fibers. Coconut coir, in its raw state, includes coconut coir fibers, which are comparatively hydrophobic natural fibers, and coconut pith, which is hydrophilic. The present disclosure uses coconut coir, preferably dry coconut coir, more preferably coconut coir having a moisture content of between 2% and 8%, most preferably coconut coir having a moisture content of 6%. The coconut coir may be dried in a rotating drum heater, preferably a rotating drum natural gas fired heater.

The current disclosure describes an improved method of separating coir fibers from pith. In a first step, coconut husk is chopped to produce coir chunks. In certain embodiments, the chopping step is carried out in a knife mill.

In certain embodiments, the knife mill has a rotor powered with an engine, i.e., a gasoline or electric engine, and a plurality of straight knife blades bolted to the periphery of the rotor. In various embodiments, coconut husk is added to a knife mill by a conveyer belt. The conveyer belt may include a slotted orienter to control orientation of coir chunks as they enter the knife mill; control of coir chunk orientation allows preparation of coir fibers having consistent lengths. In other embodiments, coconut husk is added to a knife mill by a hopper. The conveyer belt may include a magnet to prevent wrenches or other loose equipment from killing or damaging the knife mill.

When coconut husk is added to the knife mill, rotation of the rotor chops the aligned coconut husk into small pieces or chunks comprising consistent length coconut coir fibers and coconut pith. The coir and pith are not easy to separate from these coir chunks. The chopping step is preferably carried out on dry coir, preferably coconut coir having a moisture content of between 2% and 8%, more preferably coconut coir having a moisture content of 6%. Alternatively, the chopping step may be carried out on coir having a higher moisture content. If chopping is carried out on wet coir, the resulting coir chunks may be dried prior to further processing.

Figure 1:
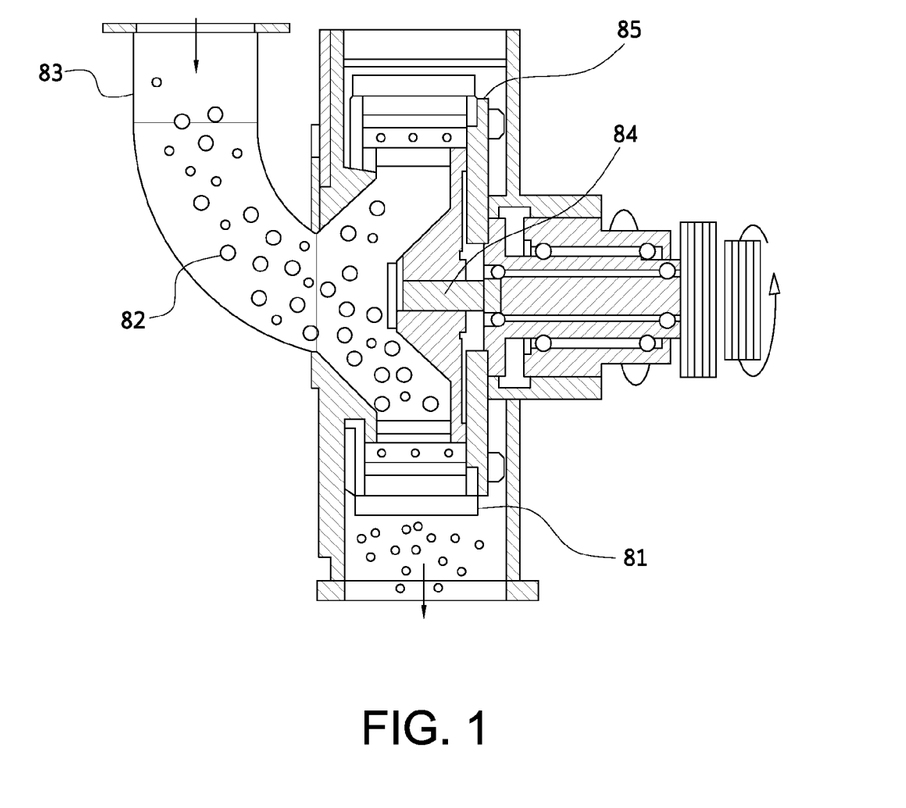
FIGS. 1-4 show mills suitable for grinding coir chunks into coir fibers and pith.

To release pith from coir chunks, coir chunks are abraded in a mill. In certain embodiments, wet or dry coir chunks are abraded in a contra-selector mill, as seen in FIG. 1. The contra-selector mill includes a rotating screen basket 81. Coir chunks 82 are deposited into the basket from inlet 83. An impellor 84 having blades 85 rotates simultaneously with rotation of the basket 81. The impellor 84 and the screen basket 81 may rotate in the same direction, or the impellor 84 and the screen basket 81 may rotate in opposite directions. Preferably, the impellor 84 and the screen basket 81 rotate in opposite directions to produce fibers. As the impellor 84 and the screen basket 81 rotate, coir chunks are ground or abraded between the blades 85 and grinding elements on the inner surface of the basket 81. As the coir chunks are ground, centrifugal forces cause the ground particles to pass through openings in the screen basket 81. The fiber size may be controlled by adjusting the rotation speed of the impellor 84 and the screen basket 81, and/or the size of the openings in the screen basket 81. The ground particles comprise coir fibers and coconut pith, and fall into a trough or hopper where they are collected after passing out of the screen basket.

According to various embodiments, wet or dry coir chunks are abraded in a contra selector mill. Abrasion of the coir fiber bundles in the mill opens the pith pockets. In certain embodiments, coir is collected in a wet state, and then the coir is stored inside for days before processing. As a result, the coir is partially dried prior to abrasion in the contra selector mill. Ground particles comprising coir fibers and coconut pith received as an output from the contra selector mill are sent to a rotating drum drier. In the rotating drum drier, the drying and rotating action of the drier causes dry pith particles to be released from the coir fibers.

Figure 2:
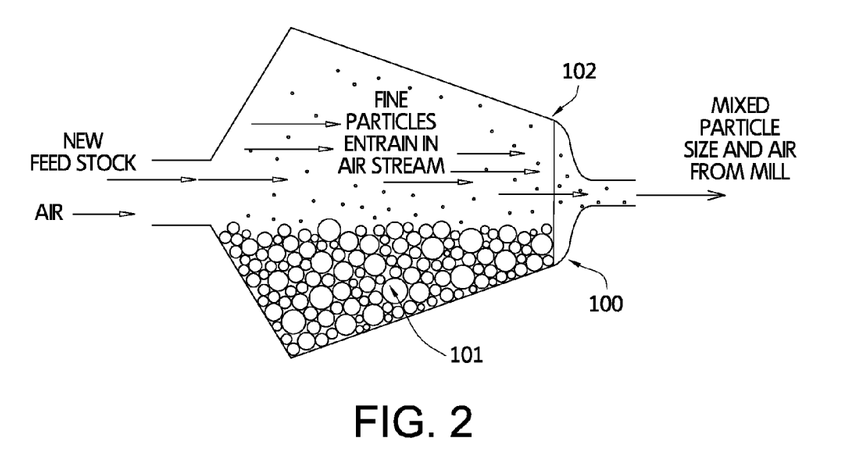

In an alternative embodiment, coir chunks may be ground or abraded in a ball mill in the presence of spherical grinding media 101, as seen in FIG. 2. The ball mill has a hollow body 100. A high speed air stream may be passed through the ball mill. As the ball mill grinds the coir chunks into individual coir fibers and pith particles, the coir fibers and pith particles are entrained in the air stream and exit the ball mill through screen 102. Screen 102 retains grinding media 101 in the ball mill. The size of the coir fibers and pith particles is controlled by the size of the openings in the screen.

Figure 3:
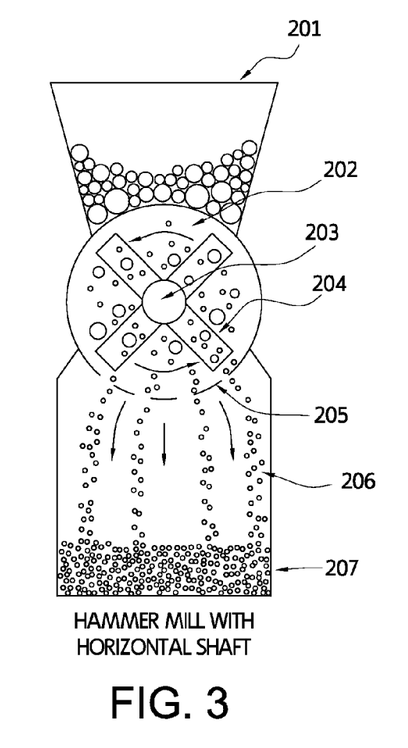

Alternatively, coir chunks may be ground or abraded in a hammer mill, as seen in FIG. 3. Coir chunks are deposited in feed hopper 201, and pass into mill chamber 202. The coir chunks are reduced in size by impact with rotating hammers 204 mounted on a rotor 203. The impact between the hammers 204 and the coir chunks shatters the coir chunks, releasing pith from coir fibers. As the coir chunks are reduced in size to the desired degree, forming pith particles and coir fibers, the pith particles and coir fibers 207 pass through a screen 205 into the bottom of the hammer mill and are collected in a container or hopper 206, and then sent to a rotating drum drier.

Figure 4:
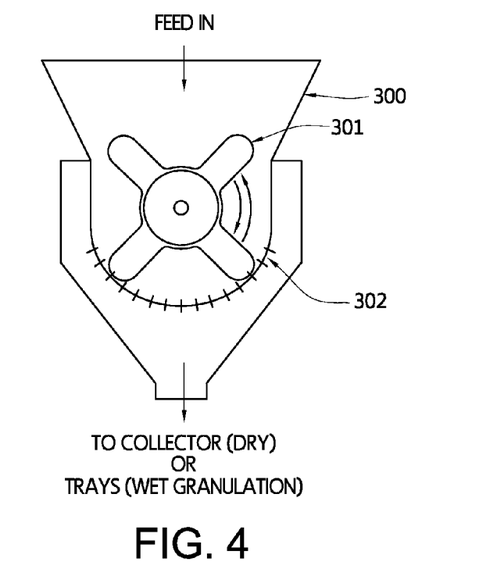

Coir chunks may also be ground or abraded to release coir fibers and pith particles in an oscillating granulator, as seen in FIG. 4. Coir chunks are placed in a hopper 300. Below the hopper is an oscillating bar 301 which contacts a woven wire screen 302. Coir chunks are abraded by shear between the oscillating bar 301 and the woven screen 302 as the bar oscillates back and forth. Coir fibers and pith particles pass through the wire screen 302, and are collected in a container or hopper, and may then be sent to a rotating drum drier.

Other devices for abrading or milling large particles may be used to reduce the size of coir chunks and release pith particles from coir fibers.

Figure 5:
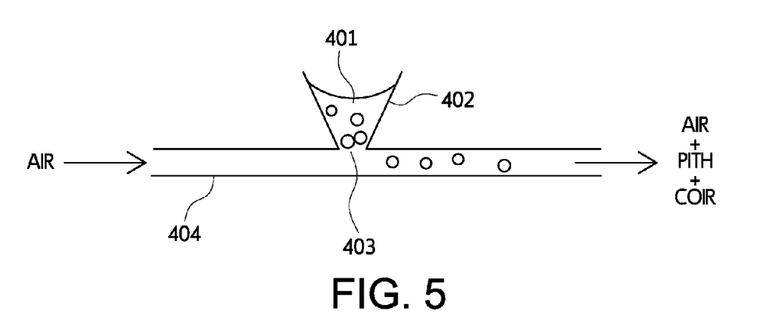
FIG. 5 shows a mechanism for entraining coir fibers and pith in an air stream, which may be a heated air stream.

Next, dry coir fibers and pith particles recovered from abrasion or milling of dry coir chunks, optionally followed by drying in a rotating drum drier, are entrained in a heated air stream. If abrasion or milling is performed in a ball mill, this step is preferably accomplished by passing a stream of high velocity heated air through the ball mill, as seen in FIG. 2. If abrasion or milling is performed in a contra-selector mill, hammer mill, or oscillating granulator, then the venturi effect is used to entrain the coir fibers and pith particles in a heated air stream, as seen in FIG. 5. The coir fibers and pith particles 401 are loaded into a hopper or tank 402 with a small hole 403 at its lower end. This hole 403 opens into a tube 404 carrying a high velocity air stream. As the air stream passes the hole 403 in the hopper or tank 402, producing a partial vacuum in the hole 403 in the hopper or tank, coir fibers and pith particles from the hopper or tank are sucked into the high velocity air stream. The high velocity air stream carries the coir fibers and pith particles into a cyclonic separator, discussed below. The cyclonic separator separates heavy coir fibers from the air stream, producing an air stream with entrained lightweight pith particles. It is important to note the importance of drying coir prior to introducing coir fibers and pith particles into the cyclonic separator. If the coir is not properly dried, the pith particles will be wet and heavy, and will not properly separate from the heavy coir fibers. The coir fibers recovered after separation from pith have a length of from 0.1 to 5 mm, preferably 0.2 to 2.5 mm, more preferably 1 to 2 mm.

Figure 6:
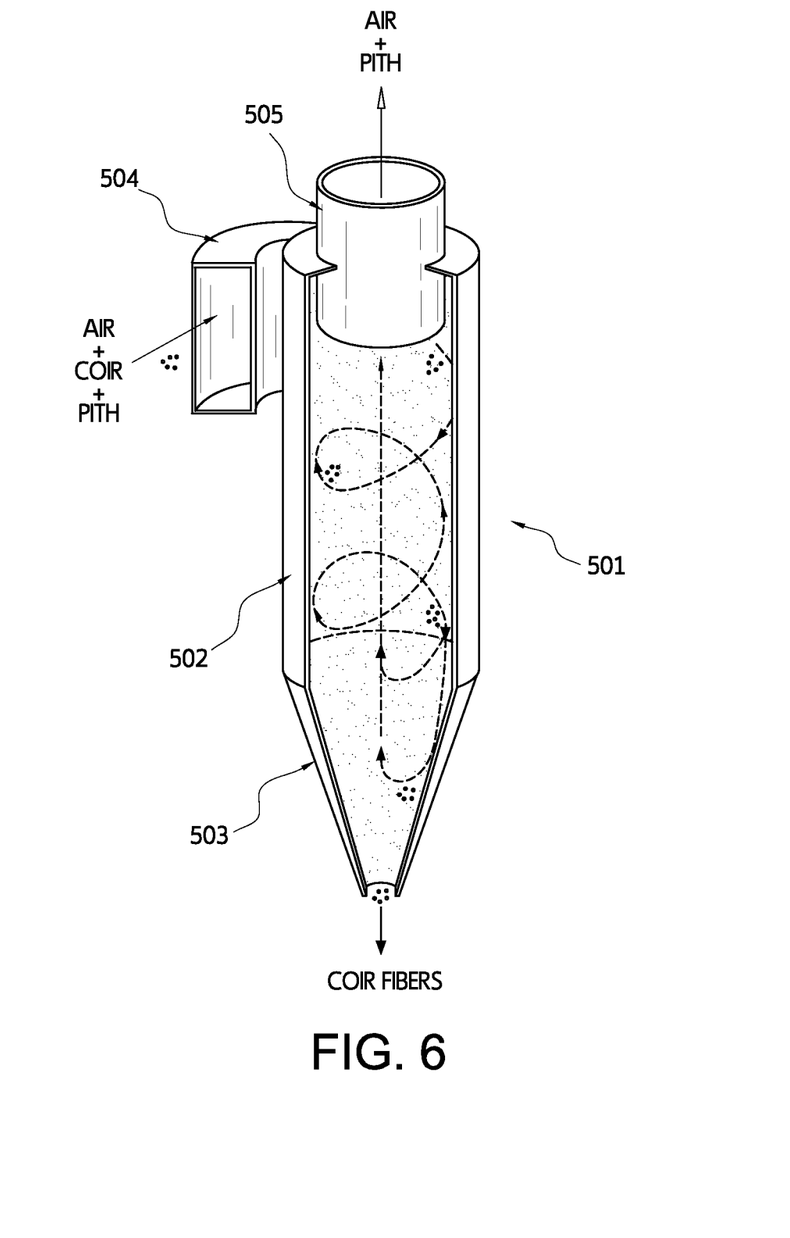
FIG. 6 shows a first embodiment of a cyclonic separator for separating coir fibers from pith.

FIG. 6 shows a cyclonic separator 501 for separating coir fiber from coconut pith. Cyclonic separator 501 includes a tubular body 502 having an opening at each end. The lower end 503 of body 502 is conical, while the upper end of body 502 is cylindrical. Cyclonic separator 501 includes an inlet 504 for a stream of air containing entrained coconut coir fibers and lightweight coconut pith. Inlet 504 injects the airstream tangentially relative to the wall of the cylindrical portion of cyclonic separator 501, establishing a helical flow of air inside the cyclonic separator. Particles entrained in this helical air flow are subjected to centrifugal force, directing the particles radially outward toward the wall of body 502, and to a buoyant force, in which the air in the helical air stream supports the particles. The buoyant force opposes the centrifugal force. The position of a particle in the helical air stream is controlled by a balance between centrifugal and buoyant forces. In general, a particle in the cyclone moves toward either the wall of the cyclone, or the central axis of the cyclone until the buoyant and centrifugal forces are balanced. Denser particles, i.e., heavy coir fiber particles, move to the outer wall of body 502, and lighter pith particles move toward the axis of the cyclone. As the dense coir fibers move toward the wall of body 502, they strike the outside wall, and fall to the bottom of the cyclone where they can be removed through an opening in the bottom of conical end 503.

The pith is lightweight, and continues to be entrained in the helical air flow until it reaches the junction of the cylindrical portion of body 502 and the conical portion 503 of body 502. This junction interrupts the helical air flow. The air then exits the cyclone in a straight stream through the center of the cyclone and out opening 505 in the top of body 502. The coconut pith is still entrained in the air stream, and is also removed through opening 505.

Figure 7:
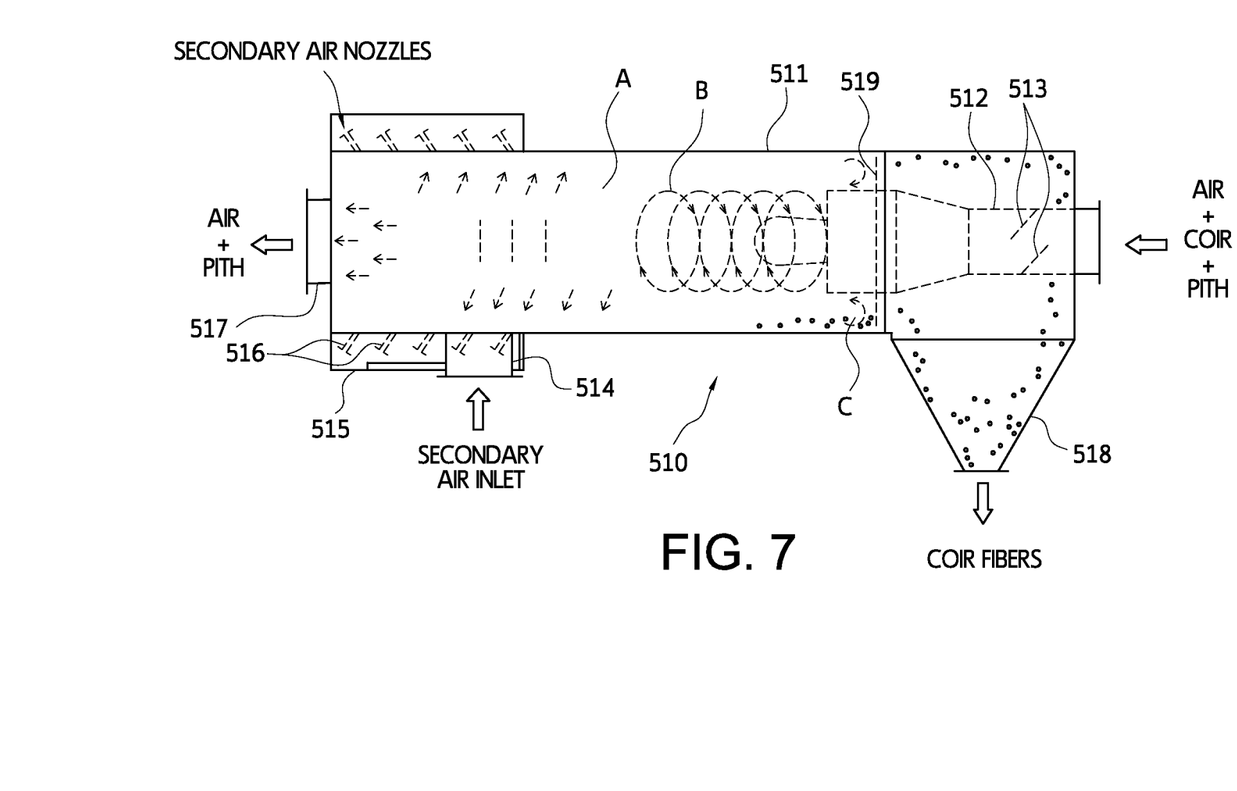
FIG. 7 shows a second embodiment of a cyclonic separator for separating coir fibers from pith.

FIG. 7 shows an alternate embodiment of a cyclonic separator for separating coir fiber from coconut pith. Cyclonic separator 510 includes a tubular body 511 having an entrance 512 at one end, and an exit 517 at the other end. Entrance 512 injects an airstream containing air and entrained coir fibers and pith particles axially into the center of the tubular body 511 of cyclonic separator 510. Entrance 512 includes a means 513 for establishing a helical flow to the airstream as it exits entrance 512, establishing a helical flow of air in the direction of arrow B inside the cyclonic separator. Means 513 may take the form of stationary spinner vanes in entrance pipe 512. Particles entrained in this helical air flow in the direction of arrow B are subjected to centrifugal and buoyant forces, directing the particles radially outward toward the wall of body 511. Denser particles, i.e., heavy coir fiber particles, move toward the outer wall of body 511, and lighter pith particles move toward the axis of the helical airflow B.

Simultaneously with introduction of an airstream containing air and entrained coir fibers and pith particles through entrance 512, a secondary air stream enters chamber 515 through inlet 514. Secondary air nozzles 516 inject air at high speed tangentially into body 511, creating a second helical airflow along the inner wall of body 511, in the direction of arrow A. Helical airflow A surrounds airflow B, and moves toward entrance 512 while airflow B moves toward exit 517. Helical airflow A entrains coir fiber particles exiting airflow B due to centrifugal force. Airflow A prevents damage to the inner wall of body 511 from impact with coir fibers, and moves coir fibers in the direction of entrance 512. Near entrance 512, airflow A strikes baffle 519, stopping the helical airflow. At this point, air from airflow A begins to flow toward exit 517 in the direction of arrow C. Air moving in the direction of arrow C and airflow B combine and exit the body 511 through exit 517, along with entrained pith. When airflow A strikes baffle 519, entrained coir fibers are released and are carried into hopper 518 for recovery.

Other embodiments of cyclonic separators are known in the art, and may be used to separate coir fibers from pith particles.

Within the cyclonic separator, air flow and collisions further separate the pith from the coir fibers. The fibers that fall to the bottom of the cyclone may also still have some coir chunks included. The coir chunks are separated from coir fibers by a vibrating or oscillating screen separator. Separated coir fibers go through the screen separator, while coir chunks are caught and returned to the conveyer leading to the knife mill for further processing. Typically, less than 10% of the output of the cyclonic separator consists of chunks that need further processing.

Figure 8:
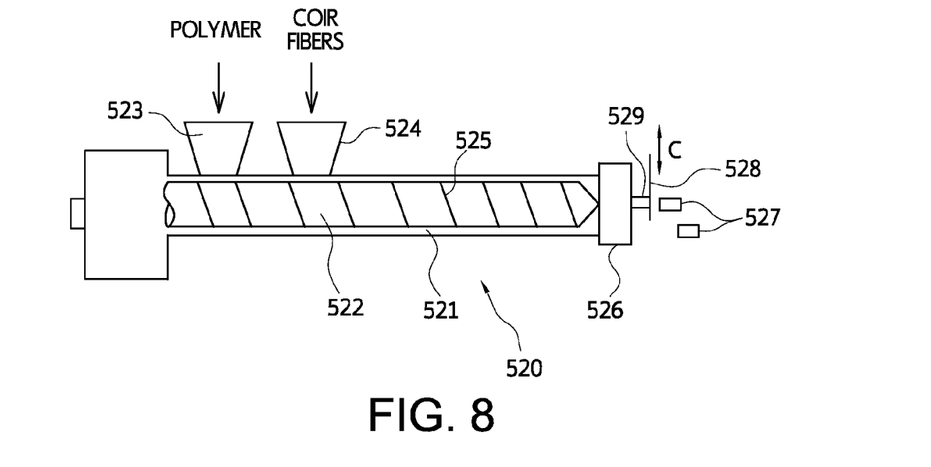
FIG. 8 shows an extruder for mixing coir fibers and polymer and extruding the resulting mixture to form pellets.

FIG. 8 shows an extruder 520 for blending a polymer with coir fibers recovered from a cyclonic separator according to FIG. 1 or FIG. 2. The extruder 520 includes a tubular body 521 with at least one helical screw 522 rotatably mounted inside. Screw 522 is driven by a motor (not shown). Screw 522 has a helical thread 525 thereon. Extruder 520 can be an extruder with a single screw, or a dual screw extruder.

Extruder 520 includes a hopper or other inlet 523 for receiving pellets of a polymer. The polymer is preferably a hydrophobic polymer; more preferably an olefin homopolymer, an olefin copolymer, polyvinyl chloride, polyvinylidine chloride, polystyrene, or a mixture thereof; still more preferably an olefin homopolymer, an olefin copolymer, polyvinyl chloride, or polyvinylidine chloride; most preferably polyethylene or polypropylene.

Extruder 520 includes a second hopper or other inlet 524 for receiving coir fibers. The interior of the screw is heated sufficiently to melt the polymer pellets. Screw 522 rotates, causing the thread 525 to knead the molten polymer and mix the molten polymer with the coir fibers. The mixture of coir fibers and polymer is extruded from extruder 520 through die plate 526, forming a strand of molten polymer 529. A cutting device having, for example, a knife blade 528 reciprocating in the direction of arrow C, cuts the strand 529 at regular intervals, forming pellets 527. Again, it is important to note the importance of drying coir early in the process disclosed herein; if the coir is not properly dried prior to separating the coir fibers and the pith, the resulting coir fibers will be wet. Preferably, the coir fibers are dried prior to their introduction into the cyclonic separator; more preferably, the coir fibers are dried to a moisture level of between 2% and 8% after grinding in a mill, i.e., a contra selector mill, but prior to their introduction into the cyclonic separator. Wet coir fibers have poor compatibility with hydrophobic polymers, when compared to dry coir fibers.

Figure 9:
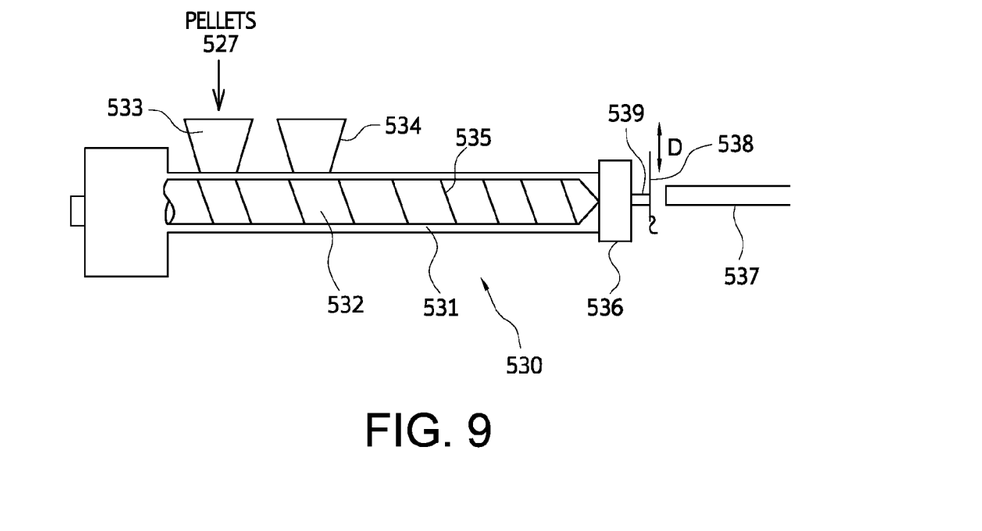
FIG. 9 shows an extruder for melting pellets of coir fibers and polymer and extruding the molten pellets to form a board.

FIG. 9 shows an extruder 530 for extruding a blend of a polymer and coir fibers. The extruder 530 includes a tubular body 531 with at least one helical screw 532 rotatably mounted inside. Screw 532 is driven by a motor (not shown). Screw 532 has a helical thread 535 thereon. Extruder 530 can be an extruder with a single screw, or a dual screw extruder.

Extruder 530 includes a hopper or other inlet 533 for receiving pellets 527, as produced by extruder 520 of FIG. 8. Pellets 527 are melted in extruder 530. Extruder 530 also optionally includes a second hopper or other inlet 534 for receiving colorants, i.e., pigments or non-reactive dyes; plasticizers; or other additives, preferably additives which do not react with reactive sites on the coir fiber, i.e., hydroxyl groups. Screw 532 rotates, causing the thread 535 to knead the molten pellets and, if necessary, mix the molten pellets with the additives. The mixture of molten pellets and additives is extruded from extruder 530 through die plate 536, forming a strand of molten polymer 539.

In certain embodiments, die plate 536 has a die with a rectangular hole, so that strand 539 has a width that is greater than its thickness. However, die plate 536 is not limited to a die with a rectangular hole. In some embodiments, die plate 536 has a die with a complex profile, so that strand 539 has a complex cross section. Strand 539 may be extruded as a hollow rectangular board with one or more support struts formed therein. Strand 539 may be extruded as a hollow or solid board with slots or notches formed therein, where the slots or notches allow multiple boards to be linked together. A cutting device having, for example, a knife blade 538 reciprocating in the direction of arrow D, cuts the strand 539 at regular intervals, forming boards 537.

The process described herein produces boards that are strong, due to the reinforcing fibers. The boards may be produced in lengths of up to 25 feet and used as load-bearing materials, i.e., flooring for decks. The boards are environmentally friendly, and water resistant. The boards are also resistant to mold. The coir fibers and polyethylene are not readily digested by termites or other insects, so the boards are resistant to termite infestation.

As an alternative to coir fibers, the process disclosed herein may be carried out using ramie or bamboo fibers to reinforce polymeric products. In some embodiments, the process disclosed herein may be carried out using coconut coir fibers in combination with ramie or bamboo fibers to reinforce polymeric products. Ramie and bamboo fibers are readily available and inexpensive materials. Ramie and bamboo fibers are renewable and resemble wood. Coconut coir fibers are also renewable; however, coconut coir fibers are more expensive than ramie and bamboo fibers. Coconut coir fibers have distinct advantages over ramie and bamboo fibers. Coconut coir fibers have longer fibers with a greater aspect ratio than either ramie or bamboo fibers, and are therefore able to provide composite boards with greater strength than composite boards reinforced solely with ramie and bamboo fibers.

In various embodiments, a composite board is produced comprising a polymer binder and coconut coir fibers as a reinforcing additive. In various embodiments, a composite board is produced comprising from 3% to 100% by weight of coconut coir fibers and from 0% to 97% by weight of bamboo or ramie fibers, based on the total weight of the fibers, and a thermoplastic resin matrix. In various embodiments, the composite board comprises from 35% to 100% by weight of coconut coir fibers and 0% to 65% by weight of bamboo fibers, based on the total weight of the fibers, and a thermoplastic resin matrix. In various embodiments, the composite board comprises from 40% to 60% by weight of coconut coir fibers and 40% to 60% by weight of bamboo fibers, based on the total weight of the fibers, and a thermoplastic resin matrix. The precise ratio of coconut coir fibers to bamboo or ramie fibers may be adjusted to obtain a desired board strength at a desired cost/unit length. Specifically, the cost/unit length decreases as the ratio of coconut coir fibers to bamboo or ramie fibers decreases; however, the board strength increases as the ratio of coconut coir fibers to bamboo or ramie fibers increases.

In various embodiments, the composite board comprises from 20% to 80% by weight of a mixture of coconut coir fibers and an optional filler, based on the total weight of the mixture, and from 20% to 80% by weight of a thermoplastic resin. In some embodiments, the composite board comprises from 20% to 50% by weight of a mixture of coconut coir fibers and the optional filler, based on the total weight of the mixture, and from 20% to 50% by weight of the thermoplastic resin.

In cases when the practitioner wishes to produce a composite board, i.e., a particle board, having coir fibers and a thermosetting binder matrix, i.e., a phenol-formaldehyde, urea-formaldehyde, melamine, or epoxy resin matrix, the board may be prepared by mixing liquid polymer precursors and coir fibers. Coir fibers are mixed with a thermosetting resin, and the mixture is formed into a sheet. The mixing step may be carried out by spraying the resin onto the coir fibers.

Once the resin has been mixed with the particles, the liquid mixture is made into a sheet. The sheets formed are then compressed under pressures between two and three megapascals and temperatures between 140° C. and 220° C. This process sets and hardens the thermosetting resin. The resulting boards are then cooled, trimmed and sanded.

In cases when the practitioner wishes to produce a composite board having coir fibers and a mineral matrix, i.e., cement or gypsum, the board may be prepared by mixing liquid polymer precursors and coir fibers. Coir fibers are mixed with a mineral binder, i.e., gypsum, and the mixture is formed into a core sheet, which is sandwiched between facing sheets of paper or a nonwoven material. The core is allowed to set and dry until it is strong enough for use as a building material.

Composite boards made using coir fiber prepared as described herein and a thermoplastic resin binder or a thermosetting matrix binder having important advantages over composite boards made using raw coir, or other natural cellulosic materials, i.e., sawdust or other wood fillers. Composite boards made with coir fiber material as described herein may, in some circumstances, possess one or more of the following advantages:

The composite boards have high strength, due to coir fibers giving the material high flexural toughness and rigidity;

The composite boards are low in cost, due to the ready availability of raw coir and the lack of any need for chemical processing of coir after removal of pith;

The composite boards are low in moisture absorption, because coir fiber are hydrophobic;

Resistant to mold;

Resistant to termites and other wood eating bugs; and

Fire retardant, because coir fibers are denser and more self-extinguishing than wood fillers.

In composite boards containing wood, mold tends to grow on wood/plastic composite surfaces because the wood filler promotes mold growth. Coir fibers have a lower tendency than wood to promote mold growth; therefore, boards containing coir fiber as a reinforcing material are more resistant to mold growth than boards containing wood fillers. Also, coir fibers are resistant to termites and other insects, as they are harder for insects to digest.

Example 1

A series of composite boards were produced by extruding a composition containing 35% by weight recycled polyethylene as a binder, and 65% by weight of vegetable fibers. The vegetable fibers contained a mixture of coconut coir fibers and bamboo fibers; or coconut coir fibers in the absence of bamboo fibers. A comparative composite board was produced by extruding a composition containing 35% by weight recycled polyethylene as a binder, and 65% by weight of bamboo fibers, in the absence of coconut coir fibers. The composite boards were subjected to testing using test methods in accordance with ASTM D7032-10, "Standard Specification for Establishing Performance Ratings for Wood-Plastic Composite Deck Boards and Guardrail Systems," and ASTM D6109-10, "Standard Test Methods for Flexural Properties of Unreinforced and Reinforced Plastic Lumber and Related Products." The testing was conducted at a relative humidity of 50%±5%, and a temperature of 52° C. The test results were used to determine the maximum distance that a board having a cross section of 8" by 1.25" between two joists can safely span. The results are reported in Table 1. The coconut coir fibers were prepared by removing substantially all of the coconut pith from coconut coir fibers by abrading the coir fibers to release pith from the coir fibers, entraining the coir fibers and pith in a high-velocity stream of heated air, and separating coir fibers from the air stream in a cyclonic separator.

As seen in Table 1, the maximum joist span at a relative humidity of 50%±5%, and a temperature of 52° C., increases from 16 inches at a coconut coir fiber content of 0-5% by weight of the board to 36 inches at a coconut coir fiber content of 65% by weight of the board. The maximum joist span at a relative humidity of 50%±5%, and a temperature of 52° C., was 30 inches for a board having a coconut coir fiber content of 45-55% by weight of the board, and a bamboo fiber content of 10-20% by weight. Use of a coconut coir fiber content of 33% by weight of the board and a bamboo fiber content of 33% by weight increases the maximum joist span by 50%, when compared to a board having only bamboo fibers.

TABLE 1

Impact of Coconut Coir Fiber Content on Joist Span Capability.

| BOARD FORMULAE | | | TEST INFO | |
| --- | --- | --- | --- | --- |
| | | | DECK/DOCK JOIST SPAN | |
| COIR FIBER % | BAMBOO FIBER % | RECYCLED Polyethylene | CAPABILITY (INCHES) | % CHANGE |
| 0% | 65% | 35% | 16 | BASELINE |
| 5% | 60% | 35% | 16 | 100% |
| 25% | 40% | 35% | 24 | 150% |
| 33% | 33% | 35% | 24 | 150% |
| 45% | 20% | 35% | 30 | 188% |
| 55% | 10% | 35% | 30 | 188% |
| 65% | 0% | 35% | 36 | 225% |

Although the various embodiments have been described in detail, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of producing a material comprising hydrophobic coconut coir fibers, comprising:
    a) chopping coconut husks to produce raw coconut coir;
    b) releasing hydrophilic coconut pith from said coconut coir by abrading said coconut coir;
    c) separating said hydrophilic coconut pith from said coconut coir in a cyclonic separator; and
    d) recovering hydrophobic coconut coir fibers from said cyclonic separator.

2. The method of claim 1, further comprising:
    e) combining said recovered hydrophobic coconut coir fibers with a binder and an optional filler to form a mixture; and
    f) forming said mixture into a product.

3. The method of claim 2, wherein said product is a board.

4. The method of claim 2, wherein said product is a plurality of pellets.

5. The method of claim 2, wherein said binder is selected from the group consisting of:
    i) a thermoplastic resin selected from the group consisting of olefin homopolymers, olefin copolymers, polyvinyl chloride, polyvinylidine chloride, polystyrene, and mixtures thereof;
    ii) a thermoset resin; and
    iii) an inorganic binder.

6. The method of claim 5, wherein said binder is said thermoplastic resin; and
    said forming comprises:
    i) forming said mixture into pellets;
    ii) melting said pellets in an extruder; and
    iii) extruding said molten pellets to form said product, wherein said product is a composite board.

7. The method of claim 5, wherein said binder is said thermoset resin or said inorganic binder; and said forming comprises compression molding said mixture to form said product, wherein said product is a composite sheet.

8. The method of claim 5, wherein said combining comprises mixing said hydrophobic coconut coir fibers with said binder in an extruder to form a mixture, said binder being said thermoplastic resin.

9. The method of claim 5, wherein said binder is an olefin homopolymer or an olefin copolymer.

10. The method of claim 9, wherein said binder is polyethylene or polypropylene.

11. The method of claim 5, wherein said binder is polyvinyl chloride or polyvinylidine chloride.

12. The method of claim 2, wherein said filler is selected from the group consisting of ramie fibers, bamboo fibers, rice hulls, wheat husks, linen, jute, bagasse, corn husks, sawdust, and mixtures thereof.

13. The method of claim 2, wherein said filler is bamboo fibers; and
    wherein said combining comprises combining from 3% to 100% by weight of said hydrophobic coconut coir fibers and from 0% to 97% by weight of said bamboo fibers, based on the total weight of the hydrophobic coconut coir fibers and bamboo fibers, with said binder to form said mixture.

14. The method of claim 13, wherein said combining comprises combining from 35% to 100% by weight of said hydrophobic coconut coir fibers and from 0% to 65% by weight of said bamboo fibers, based on the total weight of the coconut coir fibers and bamboo fibers, with said binder to form said mixture.

15. The method of claim 14, wherein said combining comprises combining from 40% to 60% by weight of said hydrophobic coconut coir fibers and from 40% to 60% by weight of said bamboo fibers, based on the total weight of the coconut coir fibers and bamboo fibers, with said binder to form said mixture.

16. The method of claim 1, wherein said combining comprises combining from 20% to 80% by weight of a mixture of said hydrophobic coconut coir fibers and said optional filler, based on the total weight of the mixture, with from 20% to 80% by weight of said binder to form said mixture.

17. The method of claim 2, wherein said hydrophobic coconut coir fibers are compatible with said binder; and
    said combining is carried out without chemically modifying said hydrophobic coconut coir fibers or adding a compatibilizing agent to said mixture.

* * * * *